Feb. 21, 1933.  I. HECHENBLEIKNER ET AL  1,898,775

AMMONIA OXIDIZING APPARATUS

Original Filed May 18, 1927   2 Sheets-Sheet 1

INVENTORS
I. HECHENBLEIKNER and
N. TITLESTAD
BY
ATTORNEYS

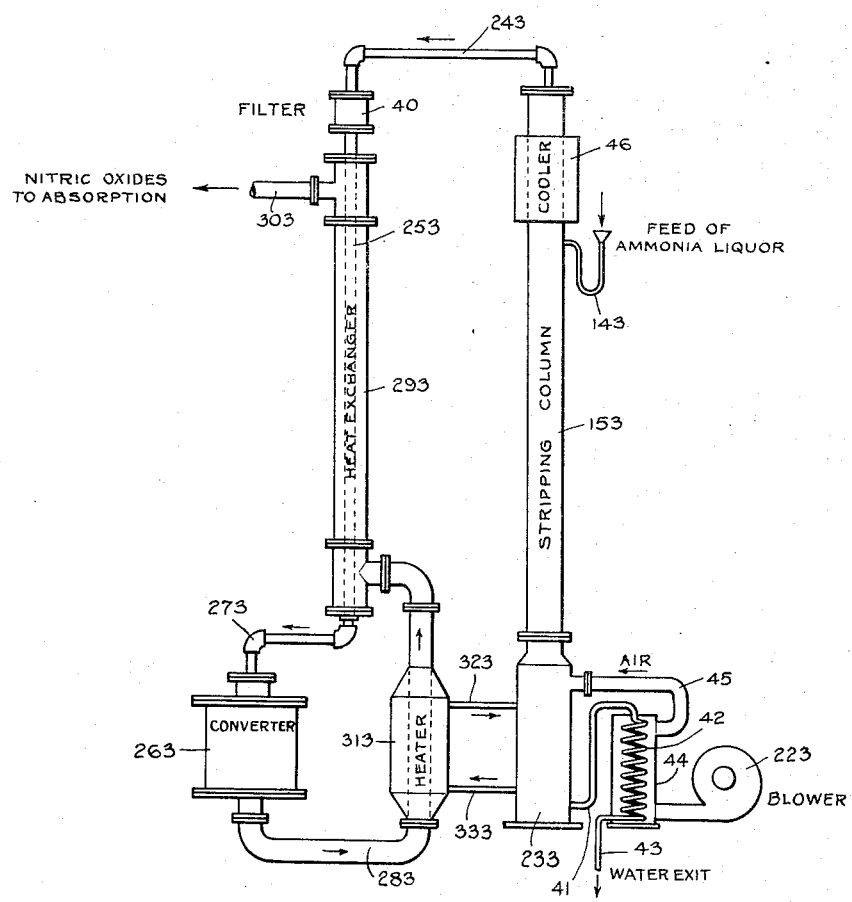

Patented Feb. 21, 1933

1,898,775

UNITED STATES PATENT OFFICE

INGENUIN HECHENBLEIKNER AND NICOLAY TITLESTAD, OF CHARLOTTE, NORTH CAROLINA, ASSIGNORS, BY MESNE ASSIGNMENTS, TO CHEMICAL CONSTRUCTION CORPORATION, OF CHARLOTTE, NORTH CAROLINA, A CORPORATION OF DELAWARE

AMMONIA OXIDIZING APPARATUS

Original application filed May 18, 1927, Serial No. 192,462, now Patent No. 1,748,646. Divided and this application filed April 3, 1929. Serial No. 352,095.

This invention relates to the process and apparatus for the oxidation of ammonia; and this application is a division of our co-pending application for ammonia oxidizing method and apparatus, Ser. No. 192,462, filed May 18, 1927, now Patent 1,748,646 issued February 25, 1930.

As commonly practiced this process utilizes ammoniacal liquor as the raw material. In essence the process consists in mixing ammonia in its gaseous form with air or oxygen, as the case may be, and passing the mixture through a catalytic converter, where after the process is once started the ammonia interacts with the oxygen or with the oxygen in the air and is converted into oxides of nitrogen. This reaction is exothermic, generating a large amount of heat which is commonly utilized for preheating the mixture of the gaseous ammonia with the air or the oxygen before it reaches the converter.

In the process as commonly practiced however, the raw material utilized is usually an ammoniacal liquor. Before the conversion can take place the ammonia is separated from the liquor by allowing the liquor to trickle downwardly through a stripping tower which is filled with small bodies of solid inert material serving to divide the liquor into a plurality of small streams. The air is blown into the stripping tower at the bottom thereof and traveling upwardly meets the streams of liquor and serves to drive off a substantial proportion of the ammonia dissolved in the liquor. In order, however, to attain a fairly complete separation of the ammonia from the liquor it has been found necessary to heat the bottom of the stripping tower by various means thereby in part preheating the air that enters the tower and in part directly heating the ammoniacal liquor at the bottom of the tower and assist in the separation of the gaseous ammonia from the liquor. Steam has been used for this purpose in sufficient quantities for the evaporation of the ammonia and for heating up the water and for compensating for heat losses.

It is very important that the steam or heat supply used in this process be regulated properly for the reason that any excessive amount of heat will evaporate the large stock of ammonia which is present in the stripping column and thereby cause the transmission of a very rich gaseous mixture to the converter. This will result in a very intense reaction in the converter giving high combustion temperatures. As a result of this, it frequently happens that the platinum gauze used as a catalizer in the converter burns out. This obviously causes a considerable amount of trouble in the replacement of the platinum gauze as well as considerable expense.

Repeated efforts have been made to overcome these difficulties by the installation of automatically controlled steam valves and the like. This involves expensive and complicated installations which do not always work reliably and which are always much too expensive and impractical for small installations.

It is the object of the present invention to overcome the above difficulties in a very simple and inexpensive manner.

One of the objects of the present invention is to obviate the necessity of using any external source of heat for the vaporization of the ammoniacal liquor or for the separation of the gaseous ammonia from its mother liquor. In the present invention the heat of the exothermal reaction which takes place in the converter is utilized as a source of heat for separation of the gaseous ammonia from the liquor.

Another object of the present invention is to make the two steps of the process above described, namely, the step of the separation of the gaseous ammonia from the mother liquor and the exothermal reaction, depend one upon the other in such a manner that the entire process is regulated automatically without any external devices or apparatus, the automatic regulation being inherent in the process as described herein.

The above objects are accomplished broadly by causing the transfer of some of the heat generated in the converter to the stripping column or to the mother liquor with the result that the reaction heat causes the separation of the gaseous ammonia from the ammoniacal liquor. In this manner the use of an external source of heat for the vaporization of the ammoniacal liquor is obviated thereby saving expense and apparatus, and in addition thereto the different parts of the process become so interdependent and interrelated that each part thereof controls the rate of operation of the other parts thereof, and thus preventing the possibility of the generation of an excessive amount of heat in the converter which is likely to burn out the platinum gauze contained therein.

While the process as discussed hereinabove and as more fully described in later portions of this application is specifically applied to the oxidation of ammonia, the same process and apparatus may be applied to other processes in which an exothermal reaction takes place and is preceded by the vaporization of the raw material.

The process and apparatus will be understood more clearly from the drawings and the description thereof which follows.

In the drawings, Fig. 1 illustrates one embodiment of the present invention,

Fig. 3 shows another embodiment of the present invention.

Figure 1:
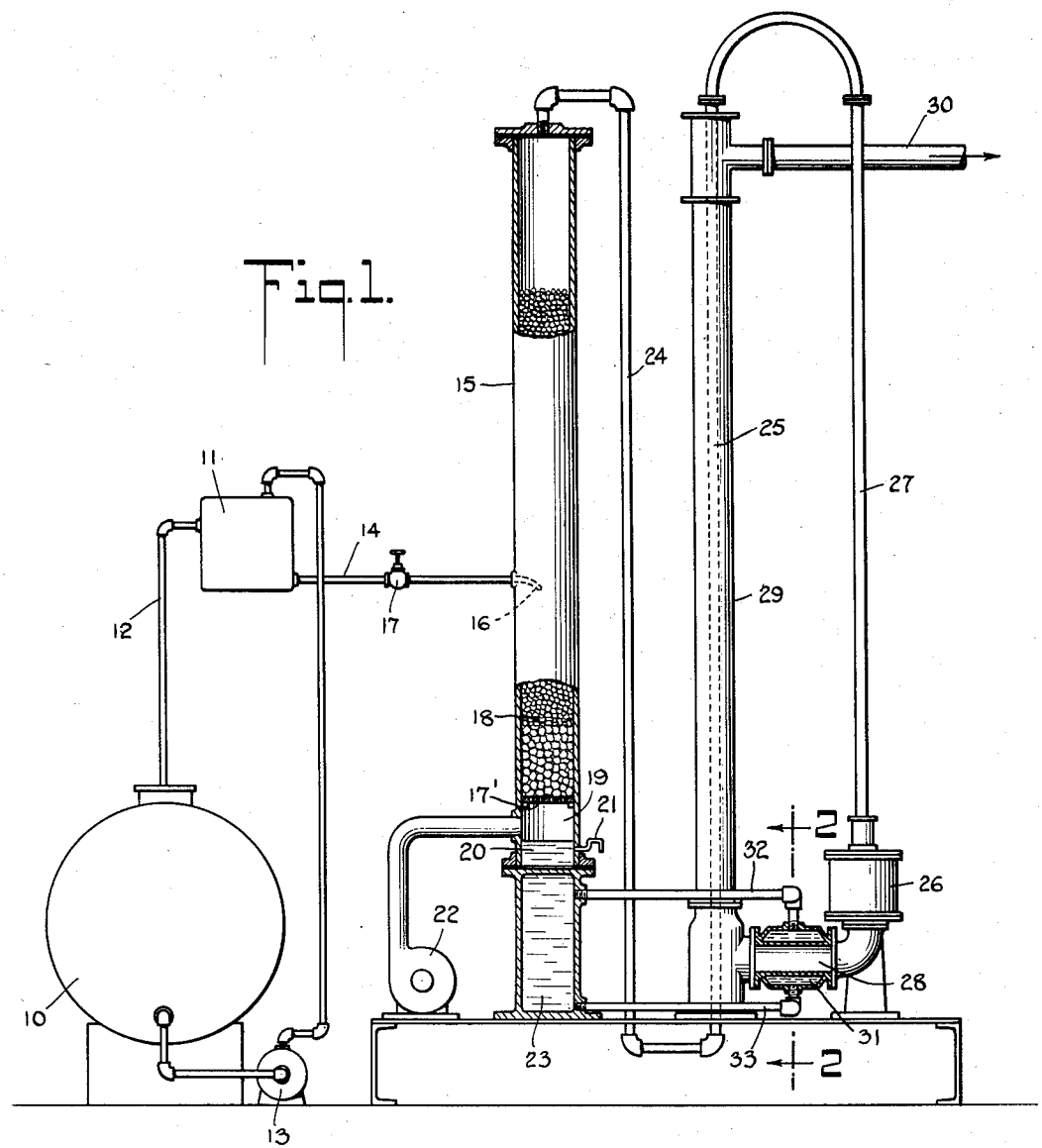
Figure 2:
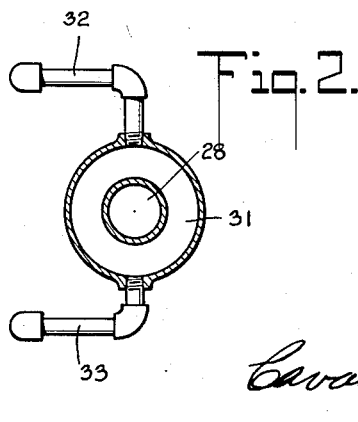
Fig. 2 is a cross section on the lines 2—2 of Fig. 1.

In the drawings 10 indicates a storage tank of ammoniacal liquor, 11 is a level tank having a pipe 12 connecting the top thereof with the top of the storage tank 10. The pipe 12 serves to maintain a predetermined level of ammoniacal liquor in the level tank 11. A pump 13 serves to feed the liquor from the storage tank 10 into the top of the level tank 11. A conduit 14 leads from a point near the bottom of the level tank 11 to a point approximately near the middle of the stripping tower or vaporizing column 15. The conduit 14 is provided with an extension 16 which projects into a vaporizing tower 15 and is additionally provided with a valve 17 which may be adjusted to any desired rate of flow of ammoniacal liquor into the vaporizing column 15.

It should be noted at this point that the rate of operation of the process disclosed herein is controlled entirely and solely by the adjustment of the valve 17. In prior processes the same valve 17 served as a controlling element of the rate of operation of the system, but the system in addition thereto was subjected to possible variations dependent upon the variations in the source of external heat employed for heating the vaporizing column. By the present invention and by the process which constitutes an embodiment of the present invention and disclosed herein this external source of variability is eliminated and the only adjustment necessary is the adjustment of the valve 17. With the valve 17 once properly adjusted the various steps of the process and the various parts of the apparatus serve as a check one upon the other, with the result that the process may then continue at a uniform rate.

The vaporizing tower 15 is provided with a foraminous false bottom 17 which permits the passage of air therethrough upwardly and the passage of waste liquor therethrough downwardly. The space above the false bottom 17 is filled with small bodies of inert solids 18 to a point which falls somewhat short of the top of the tower. The vaporizing tower 15 is provided with a chamber 19 immediately below the foraminous bottom 17 for the reception of the waste liquor 20 which is maintained at a constant level by the waste overflow 21. An air blower 22 blows air into the chamber 19 which passes upwardly in the column 15 and serves to aid in the vaporization of the mother liquor that trickles down in small streams on and between the solids 18. The tower 15 rests over the water tank 23 whose function and relation to the other parts of the apparatus and the process will be more fully described hereinafter.

The mixture of air and gaseous ammonia passes out of the vaporizing tower and downwardly by way of the pipe 24, and then upwardly by way of the pipe 25 shown in dotted lines in Fig. 1 where it is preheated by the products of combustion formed in the converter 26, and the mixture then enters the converter 26 through a pipe 27. In the converter the gaseous ammonia and the air are caused to interact to form oxides of nitrogen in the presence of the catalyst, which may be a platinum gauze or any other suitable catalyst. This reaction is accompanied by the generation of heat so that the resultant products are heated. These products then pass through the conduit 28 and enter the preheating chamber 29 which surrounds the pipe 25 and thereby transferring some of its heat to the gaseous mixture flowing therein. The reaction products then pass out of the system through the conduit 30 and are directed to a Glover tower for the absorption of the oxides of nitrogen.

Except for the water tank 23, the process and apparatus so far described are old and well known in the art. The present invention is directed to a modification of the process whereby the use of any external heat for the separation of the ammonia from the ammoniacal liquor is obviated, the heat being supplied by the reaction products formed in the converter. For this purpose, the conduit 28 carrying the heated reaction products is surrounded by a water jacket 31 which in turn is put into communication with the water tank 23 by means of the pipes 32 and 33, the pipe 32 connecting the upper portions of the tank 23 and the jacket 31, whereas the pipe 33 connects the lower portions of the pipe 33 and the jacket 31.

The reaction products passing through the conduit 28 transfer their heat to the water in the jacket 31, and this hot water then circulates in accordance with the principle of the thermal siphon in the closed system formed by the tank 23, the jacket 31 and the connecting pipes 32 and 33.

The water jacket 31 serves as a heater for the water tank 23 and will hereinafter be referred to as the water heater. This heater is given a heating surface which is just sufficient to supply the heat required for the separation of the gaseous ammonia from the ammoniacal liquor and also supply the necessary concomitant heat losses. The specific dimensions and design of the heater will depend upon the size of the installation and it may be stated that in all cases the heater will reduce the temperature of the reaction products coming from the converter approximately 150 to 200° C.

Assuming a constant flow of ammoniacal liquor into the vaporizing tower 15 and a constant flow of air in the system, the rate of vaporization of the ammoniacal liquor, or rather, the rate of separation of gaseous ammonia from the ammoniacal liquor will depend upon the temperature of the water tank 23, which in turn depends upon the temperature of the heater 31. On the other hand, the temperature of the reaction products flowing through the conduit 28 which determine the temperature of the heater 31 itself depends upon the concentration of gaseous ammonia in the mixture that passes into the converter 26. In this system, therefore, the process will continue uniformly and will depend entirely upon the rate of flow of ammoniacal liquors in the vaporizing tower 15. Should it be desired at any time to increase the rate of operation of the process, all that is necessary is to adjust the valve 17 to the desired increased flow of ammoniacal liquors into the system. This will bring about a richer gaseous mixture entering the converter 26, causing the generation of a larger amount of heat and an increased temperature of the reaction products. This will cause the generation of a larger amount of heat, a rise to some extent in temperature, because of heat losses being relatively less, and higher gas velocity through heater 31. This increase, however, of the amount of heat available for the separation of the gaseous ammonia from the mother liquor will not be so large as to cause the sudden or rapid vaporization of the large store of ammonia within the vaporizing tower. In other words, the process disclosed herein is inherently and automatically self regulating without the application of any external source of heat or any external device of any kind.

This process is of great advantage when applied to the ammonia oxidation processes. The basic principle involved herein, however, may also be applied to any one of a number of processes which comprise the step of vaporization and an exothermal reaction.

Fig. 3 shows a modification of the process and apparatus disclosed in Fig. 1. For the purpose of comparison and for the purpose of making this figure readily intelligible, reference numerals which are related to the reference numerals shown in Fig. 1 by the addition of the digit "3" thereto will be used for indicating similar parts.

In Fig. 3, 153 indicates the stripping or vaporizing column which receives its ammonical liquor through the conduit 143. The mixture of gaseous ammonia and air passes through the conduit 243 and through the filter 40, and then through the conduit 253 shown in dotted lines which is surrounded by the preheater 293, and then along the conduit 273 into the converter 263. The reaction products pass through the conduit 283 transferring some of their heat to the water heater 313 and then through the preheater 293 and out through the conduit 303 to the absorption tower not shown. As in the apparatus and process shown in Fig. 1, the heater 313 communicates with the water tank 233 by means of the pipes 323 and 333. In this modification of the invention, however, the tank 233 is open at the top and serves to receive the waste liquor which is practically denuded of its ammonia contents. The hot water in the tank 233 is maintained at a predetermined level by means of the overflow pipe 41, the heat overflow passing through the coil 42 and is discharged through the outlet 43. The coil 42 is surrounded by a chamber 44 and the air blower 223 communicates with the bottom of the said chamber. The air is therefore preheated in the chamber 44 and passes through conduit 45 into the bottom of the stripping or vaporizing column 153 at the point immediately over the level of the hot water and waste liquor in the tank 233. The stripping or vaporizing tower 153 is additionally provided with a cooler 46 which may be so constructed as to surround the tower at the top thereof or in similar installations it may be enclosed inside the tower. The cooler 46 serves to condense any water vapor that may pass up the column and thus prevents the entry of any water vapor into the converter 263.

The principle of operation of the process and apparatus shown in Fig. 3 is the same as that shown in Fig. 1. The heat necessary for the separation of the gaseous ammonia from the ammonia liquor is derived entirely from the heat reaction products with the same advantageous results as those described before. The rate of the reaction will depend entirely upon the rate of feeding of the ammonia liquor. The heater 313 is so designed as to supply the necessary amount of heat for that purpose and also to supply the heat losses of the system. The process, like the process described in connection with Fig. 1 is inherently automatically regulated to maintain a uniform rate of reaction within the converter and thus obviating the possibilities of burning out the platinum gauze. In addition to these advantages in the process and apparatus shown in Fig. 3, the air entering the vaporizing column is preheated and the cooler or condenser 46 serves to prevent the increase of water vapor into the converter.

The process and apparatus shown in Fig. 3, like that shown in Fig. 1, may, if desired, be applied to processes other than the oxidation of ammonia in which an exothermal reaction takes place which is preceded by the vaporization of the raw material.

It should also be noted that in the process shown in Fig. 3 the heat exchanger 293 works on the counter-current principle which makes it possible to utilize almost all of the heat generated in the converter 263, part of the heat being transferred to the vaporizing tower and utilized for the separation of the ammoniacal gas from the mother liquor, and the remainder of the heat being utilized for preheating the gaseous mixture before it enters the converter 263.

This system as shown in either Figs. 1 or 3, is very flexible and will not require any attention. There are no complicated valves or mechanism to watch, which is of special advantage in small plants. There can be no fear of excessive heat in the system, as the quantity is limited by the heat of reaction at the capacity of the plant and the heating surface of the heater. There can be no sudden changes in heat because of the limited quantity of heat at disposal.

In case of operation of the plant at lower than rated capacity, there will theoretically be an excess of heat, because the heating surface of the heater is then comparatively larger. The heat losses of the plant will, however, fully or partly take care of this. The temperature of gas entering the heater will be less, the flow slower, which reduces the heat transmission approximately by the square root of the velocity, and the heat loss of the stripping column relatively higher. All taken into consideration there will, by correct design, be approximately constant conditions at all rates of flow. The small fluctuations and irregularities that may occur will be taken care of by the cooler at the top of the stripping column.

It will also be apparent that while we have shown and described our invention in the preferred form, many changes and modifications may be made in the structure disclosed without departing from the spirit of the invention, defined in the following claims.

We claim:

1. In an apparatus for the oxidation of ammonia comprising a vaporizing tower, a catalytic converter, means associated with said catalytic converter adapted to be heated by the reaction heat generated in said converter, and a heater for said vaporizing tower connected to said means and deriving its heat therefrom.

2. In an apparatus for the oxidation of ammonia comprising a vaporizing column, a catalytic converter, and means for transferring reaction heat from the catalytic converter to the vaporizing column including a water containing heater in said vaporizing column connected to said converter and deriving its heat from the reaction products of said converter.

3. In an apparatus for the oxidation of ammonia comprising a vaporizing column, a catalytic converter, a conduit leading from the converter and carrying the reaction products, and heater means for transferring reaction heat from said converter to the vaporizing column including a water jacket surrounding said conduit.

4. In an apparatus for the oxidation of ammonia comprising a vaporizing column, a catalytic converter, and means for transferring reaction heat from the catalytic converter to the vaporizing column comprising a water tank disposed below said vaporizing column and a heater in communication therewith deriving its heat from the reaction products of the converter 5. In an apparatus of the oxidation of ammonia comprising a vaporizing column, a catalytic converter, a conduit carrying reaction products from said converter, and means for transferring reaction heat to the vaporizing column including a water heater surrounding said conduit and a water tank disposed below said vaporizing column and in communication with said heater.

6. An apparatus for the oxidation of ammonia comprising a vaporizing column, a catalytic converter, a conduit leading the reaction products from said converter, a water heater associated with said conduit to derive its heat from said reaction products, a water tank disposed at the bottom of the vaporizing column in communication with said water heater, overflow means for said water tank, a chamber surrounding said overflow means in communication with said vaporizing column, and means for blowing air into said vaporizing column connected to said chamber.

7. In an apparatus for subjecting a material to vaporization and to an exothermic reaction, a vaporizing chamber for subjecting the material to vaporization, a reaction chamber for subjecting the vaporized material to an exothermic reaction, and means for transferring the reaction heat from the reaction chamber to the vaporizing chamber for vaporization purposes, said means comprising a heater for said vaporizing chamber, a heat exchange means for said reaction chamber, and means connecting the heater to said heat exchange means.

8. In an apparatus for separating a gas from a liquor containing said gas and for subjecting said gas to an exothermic reaction comprising a chamber for separating the gas from the liquor, means for mixing air with said gas, a reaction chamber for subjecting said mixture to an exothermic reaction, means associated with said reaction chamber adapted to be heated by the reaction heat generated therein, and a heater for said separating chamber connected to said means and deriving its heat therefrom.

9. In an apparatus for the oxidation of ammonia comprising a vaporizing tower, a catalytic converter, a first heat exchange means connecting said catalytic converter with said vaporizing tower for preheating the gases moving from the vaporizing tower to the catalytic converter, and a second heat exchange means connecting said vaporizing tower with the catalytic converter for transferring reaction heat from the converter to the vaporizing tower to vaporize the ammonia therein.

10. In an apparatus for the oxidation of ammonia comprising a vaporizing tower, a catalytic converter, heat exchange means connecting the vaporizing tower with the catalytic converter and operative for transferring reaction heat from the catalytic converter to the vaporizing tower to vaporize the ammonia therein, means for introducing air into the vaporizing tower for mixture with the vaporized gases therein, and means for utilizing a portion of the heat of said heat exchange means for preheating the air introduced into the said vaporing tower.

11. In an apparatus for the oxidation of ammonia comprising a vaporizing tower, a catalytic converter, heat exchange means connecting the vaporizing tower with the catalytic converter and operative for transferring reaction heat from the catalytic converter to the vaporizing tower to vaporize the ammonia therein, means for introducing air into the vaporizing tower for mixture with the vaporized gases therein, means for utilizing a portion of the heat of said heat exchange means for preheating the air introduced into the said vaporizing tower, and a second heat exchange means connecting the converter with the vaporizing tower for preheating the mixture of gases moving from the vaporizing tower to the converter.

12. In an apparatus for the oxidation of ammonia comprising a vaporizing tower, a catalytic converter, a heat exchange means connecting the vaporizing tower with the catalytic converter including a water circulating system and operative for transferring reaction heat from the catalytic converter to the vaporizing tower to vaporize the ammonia therein, means for blowing air into the vaporizing tower for mixture with the vaporized gases therein, means for utilizing a portion of the heat of said water circulating system for preheating the air introduced into the said separating tower, and a second heat exchange means connecting the converter with the vaporizing tower for preheating the mixture of gases moving from the vaporizing tower to the converter.

13. In an apparatus for the oxidation of ammonia comprising a vaporizing tower, a catalytic converter, heat exchange means connecting the vaporizing tower with the catalytic converter including a water circulating system and operative for transferring reaction heat from the catalytic converter to the vaporizing tower to vaporize the ammonia therein, means for blowing air into the vaporizing tower for mixture with the vaporized gases therein, and means for utilizing a portion of the heat of said water circulating system for preheating the air introduced into the said vaporizing tower.

14. In an apparatus for the oxidation of ammonia comprising a vaporizing tower, a catalytic converter, an exit conduit for said converter, a first heat exchange means connecting said exit conduit with said vaporizing tower for preheating the gases moving from the vaporizing tower to the catalytic converter, and a second heat exchange means connecting said vaporizing tower with said exit conduit for transferring reaction heat from the converter to the vaporizing tower to vaporize the ammonia therein.

15. In an apparatus for separating a gas from a liquor containing said gas and for subjecting said gas to an exothermic reaction comprising a chamber for separating the gases from the liquor, means for mixing air with said gas, a reaction chamber for subjecting said mixture to an exothermic reaction, and a water circulating system for transferring heat from the reaction chamber to the gas separating chamber for separating the gas from the liquor therein.

Signed by said INGENUIN HECHENBLEIKNER at Charlotte in the county of Mecklenburg and State of North Carolina this 25 day of March A. D. 1929.

INGENUIN HECHENBLEIKNER.

Signed by said NICOLAY TITLESTAD at Buffalo, in the county of Erie and State of New York, this 29 day of March, 1929.

NICOLAY TITLESTAD